United States Patent
Wragg et al.

(10) Patent No.: US 6,838,110 B2
(45) Date of Patent: Jan. 4, 2005

(54) INSTANT DRY MIX COMPOSITION FOR PROVIDING A BEVERAGE HAVING A TWO-TONED FOAM ON ITS SURFACE

(75) Inventors: Anthony Wragg, Banbury (GB); Maria Velissariou, Shotteswell (GB); Paul Martin Edwards, Cheney (GB); Phillip Keith Brown, Chipping Warden (GB)

(73) Assignee: Kraft Foods Holdings, Inc., Northfield, IL (US)

( * ) Notice: Subject to any disclaimer, the term of this patent is extended or adjusted under 35 U.S.C. 154(b) by 168 days.

(21) Appl. No.: 10/152,347

(22) Filed: May 22, 2002

(65) Prior Publication Data

US 2003/0219522 A1 Nov. 27, 2003

(51) Int. Cl.⁷ .............................. A23F 5/00; A23F 5/28
(52) U.S. Cl. ....................................... 426/594
(58) Field of Search .................. 426/589, 590, 426/594, 650, 569, 570

(56) References Cited

U.S. PATENT DOCUMENTS

| | | | |
|---|---|---|---|
| 3,869,555 A | | 3/1975 | Heonis |
| 4,438,147 A | * | 3/1984 | Hedrick, Jr. ................. 426/570 |
| 5,350,591 A | | 9/1994 | Canton |
| 5,433,962 A | | 7/1995 | Stipp |
| 5,474,792 A | * | 12/1995 | Arora et al. ................. 426/594 |
| 5,721,003 A | | 2/1998 | Zeller |
| 5,780,092 A | * | 7/1998 | Agbo et al. ................. 426/569 |
| 5,882,716 A | | 3/1999 | Munz-Schaerer et al. |
| 5,882,717 A | * | 3/1999 | Panesar et al. ............. 426/595 |
| 6,048,567 A | * | 4/2000 | Villagran et al. ........... 426/594 |
| 6,090,424 A | | 7/2000 | Mickowski et al. |
| 6,168,819 B1 | * | 1/2001 | Zeller et al. ................. 426/569 |
| 6,174,557 B1 | * | 1/2001 | Gamez-Rumpf et al. ... 426/594 |
| 6,399,131 B2 | * | 6/2002 | Zeller et al. ................. 426/520 |
| 6,426,110 B1 | * | 7/2002 | Basa ........................... 426/588 |
| 6,534,108 B2 | * | 3/2003 | Jimenez-Laguna et al. . 426/565 |
| 6,544,576 B2 | * | 4/2003 | Zeller et al. ................. 426/594 |
| 6,569,486 B2 | * | 5/2003 | Cirkel-Egner et al. ...... 426/594 |
| 6,572,905 B2 | * | 6/2003 | Zeller et al. .................. 426/89 |

FOREIGN PATENT DOCUMENTS

| | | |
|---|---|---|
| DE | 298 11 729 | 10/1998 |
| EP | 0458310 | 11/1991 |
| EP | 0 756 844 | 2/1997 |
| EP | 0 916 266 | 5/1999 |
| EP | 1 129 624 | 9/2001 |
| EP | 1 133 923 A1 * | 9/2001 |
| WO | WO 98/34495 | 8/1998 |

\* cited by examiner

*Primary Examiner*—N. Bhat
(74) *Attorney, Agent, or Firm*—Marvin Petry, Esq.; Stites & Harbison PLLC

(57) ABSTRACT

An instant dry mix composition produces a beverage having a two-toned foam on the surface upon reconstitution in a hot liquid. The composition includes a foaming creamer for producing a foam layer and a separately enclosed quick dissolving or dispersing flavor/color component and optional sweetener component. The density of the combined flavor/color component and optional sweetener component is higher than the density of the foam layer. A beverage is prepared by combining the foaming creamer and hot liquid until the foaming creamer dissolves and creates a foamed layer on the surface. The combined flavor/color component and optional sweetener component is then added. Upon stirring the resultant mixture, a two-toned effect results in the foam layer.

29 Claims, No Drawings

INSTANT DRY MIX COMPOSITION FOR PROVIDING A BEVERAGE HAVING A TWO-TONED FOAM ON ITS SURFACE

FIELD OF THE INVENTION

The present invention relates to an instant dry mix composition and, more particularly, to a composition which upon reconstitution in a hot liquid provides a quick-dissolving beverage having a two-toned foam on its surface.

BACKGROUND OF THE INVENTION

A recent trend in the food/beverage industry has been the emergence of coffee shops which serve cappuccino and other coffee beverages having a foamed upper surface. Moreover, these shops often serve hot drinking chocolate and tea which may also have a foamed upper surface. Authentic cappuccino, as well as other hot beverages from a machine, are made by combining foamed milk and a beverage. When the beverage is stirred the white foam at the surface of the beverage tends to take on a two-toned appearance wherein portions are white or lightly colored while other portions are brown or darker in color.

With increasing popularity of these types of drinks, numerous instant cappuccino beverages and the like have appeared in the marketplace. Generally, these instant beverages fail to have the appearance of an authentic beverage because the foamed surface tends to primarily be brown color.

A recent patent which attempts to overcome the drawback of brown colored foams on instant coffee beverages is U.S. Pat. No. 5,882,716, which discloses a soluble beverage powder made of a soluble whitener powder containing a gas and a soluble coffee powder of delayed water solubility. Upon addition of water, the soluble whitener powder dissolves first. The coffee then dissolves such that the upper surface foam remains primarily white, or a very light color. However, a drawback of this beverage powder is that the consumer must wait up to 10 seconds, and possibly even longer, before the beverage is ready to drink. Moreover, the upper surface foam is still primarily white and, therefore, does not have the two-toned appearance of a conventional cappuccino beverage.

Accordingly, it is an object of the present invention to provide an instant dry mix beverage composition that produces a two-toned foam on its surface upon reconstitution in a hot liquid. The composition may be utilized with drinking chocolate, tea, coffee or any other beverage wherein a two-toned surface foam is desirable. The beverage has a two-toned surface foam when subjected to 3–5 quick stirs, which is equivalent to about 2–3 seconds, thereby eliminating the need for delayed dissolution or dispersion of the beverage.

SUMMARY OF THE INVENTION

The foregoing and other objects, which will be apparent to those of ordinary skill in the art, are achieved in accordance with the invention by providing an instant dry mix composition for producing a beverage having a two-toned foam on its surface comprising a foaming creamer for producing a foam layer upon reconstitution in a hot liquid and a mixture of a fast dissolving or fast dispersing flavor/color component and an optional sweetener component, the density of the mixture being at least 1.9 times higher than the density of the foam layer.

In a preferred embodiment, the mixture includes agglomerated coffee as the soluble flavor/color component and further includes fine granulated sugar as the optional sweetener component. The density of the sugar/coffee mixture ranges from 46–70 g/100 ml and the density of the foam layer produced upon reconstitution of a foaming creamer in hot water ranges from 17–25 g/100 ml, typically 19–21 g/100 ml. A hot instant cappuccino beverage is prepared using this formulation by dissolving the creamer in hot water and then adding the mixture of sugar and coffee. With 3 to 5 quick stirs, a beverage a having two-toned foam surface results.

DETAILED DESCRIPTION OF THE PREFERRED EMBODIMENTS

The instant dry mix composition of the invention, upon reconstitution in a hot liquid, provides a beverage having a two-toned foam on its surface, which has the appearance of an authentic beverage. The term "instant" as used herein refers to a product that readily dissolves or disperses in a hot liquid suitable for drinking, particularly hot water or hot milk. The term "two-toned" foam as used herein refers to a white or colored foam, the surface of which is interspersed with at least 20–80%, preferably 20–60%, of comparatively darker colored areas. Where the beverage is coffee or hot chocolate, the darker areas will generally be brown. However, where the beverage is tea, the darker areas may be green or yellow. The remainder of the foam may be white or simply a distinctly lighter shade than the darker areas. The phrase "3–5 quick stirs" should be considered as equivalent to about a 2–3 second period of stirring using a conventional plastic stirrer, a spoon or other utensil. This is the time required to sufficiently dissolve or disperse the flavor/color component such that the beverage is drinkable. Moreover, although the composition of the invention may be utilized in conjunction with any type of instant hot beverage wherein a two-toned foam surface is desirable, the disclosure will focus primarily on a composition for making an instant cappuccino. All percentages herein are percentages by dry weight of the relevant component.

The composition of the invention includes a foaming creamer and a flavor/color component. The composition may further include an optional sweetener component which is combined with the flavor/color component to form a mixture. Because a sweetener component is typically combined with the flavor/color component in the composition of the invention, this disclosure will focus on compositions containing a mixture of the two components. However, it is to be understood that a sweetener component need not be included in the composition of the invention.

When the composition is packaged, the mixture is separately enclosed from the foaming creamer. In a preferred embodiment, the composition is packaged in single serving sizes. In order to prepare a hot beverage from the dry mix composition, the foaming creamer is combined in a cup with a hot liquid, typically water or milk. The mixture is stirred until the creamer has dissolved and a foam layer results. The combined sweetener and flavor/color components are then added. The density of the combined sweetener and flavor/color components is at least 1.9 times, preferably 2.3 times, higher than the density of the foam layer, enabling the majority of the flavor/color component to be propelled through the foam layer. Upon rapid stirring, i.e., 3–5 quick stirs, the flavor/color component dissolves or disperses to form a drinkable beverage. A small amount of flavor/color component remains in the foam layer leaving darker, or differently colored streaks, spots and swirls which create a two-tone effect in the foam layer.

As demonstrated in Example 5 below, if the ratio of coffee+sugar to foam is >2.3, then a two-toned foam is always achieved. If the density ratio of coffee+sugar to foam is between 1.9–2.29, then two-toned foam is best achieved when the weight ratio of coffee+sugar mixture/creamer is >1. If the density ratio of coffee+sugar to foam is below 1.9, a two-toned effect is not achieved.

To achieve the most desirable effects, the components of the instant dry mix composition are packaged in a multi-compartment system. The creamer is packaged by itself. The sweetener component and flavor/color component are packaged together, but separately from the creamer. Preferably, the sweetener and flavor/color components are packaged in a system which creates a funnel effect when the contents are poured into the cup, for example, a stick-pack, which is an elongated sachet. Another packaging alternative is a pinch-pack, wherein the creamer and flavor/color components are layered in a single packet. Typically, the user combines the creamer with a hot liquid by pinching the packet so as to allow only the desired amount of creamer to be added to the cup. The user then opens the opposite end of the packet and pinches the packet so as to allow only the flavor/color component to flow into the cup. Of course, other techniques may be used to prepare a beverage using a pinch-pack and a sweetener component may be used as one of the layers.

The components are usually packaged as single servings. As is demonstrated in Example 3 below, the effect of a two-toned foam is achieved regardless of the type of cup/mug in which the beverage is prepared.

The creamer used in the invention may be any conventional creamer that creates a significant amount of a stable, creamy foam layer which is similar to that of steamed milk foam. However, in selecting the creamer, it is necessary to take into account the density of the combined sweetener and flavor/color components, since the density of the combined sweetener and flavor/color components should be at least 1.9 times higher than that of the foam layer to achieve the two-toned effect. The creamer may be dairy-based or non-dairy based or a combination thereof, and includes protein, lipid and fillers as essential components. To achieve the foaming effect, the creamer includes a source of gas to create the foam. This may be a simple incorporation of gas bubbles within the dry creamer which are released when dissolved in a hot liquid or it can involve the use alone, or additionally, of chemical carbonation to generate gas when the creamer is dispersed in hot liquid. The creamer may be packaged and used as such or it may be dry-mixed with sweeteners, flavors, colors and other ingredients conventional in spray dried powder creamers and in instant beverage compositions. Suitable gas-injected foaming creamers are disclosed in U.S. Pat. No. 4,438,147, U.S. Pat. No. 4,736,527 and U.S. Pat. No. 4,798,040, the disclosures of which are incorporated herein by reference. Suitable foaming creamers containing a carbonation system are disclosed in U.S. Pat. Nos. 5,721,003 and 5,780,092, the disclosures of which are incorporated herein by reference and in published German Patent Application No. 4,407,361 A1 published on Sep. 7, 1995. As is demonstrated in Example 1, most conventional creamers, having a density of about 12–20 g/100 ml will produce foam layers having a density in the range of 16–25 g/100 ml. In the preferred embodiment, a creamer which produces a foam layer having a density of 19–21 g/100 ml is utilized.

The sweetener component, if utilized, is present in an amount such that the beverage is appropriately sweetened. The amount of sweetener component present in the composition is dependent on the type of sweetener as well as whether a sweetener is also present in the creamer. The sweetener component may be natural or artificial. Suitable natural sweeteners include corn syrup solids or other sugar sweeteners such as sucrose, fructose, lactose and maltose.

The term flavor/color component refers to an instant particulate beverage such as coffee, tea, hot chocolate or any other beverage wherein a foamed surface is desirable, but does not include sweeteners or creamers. The term flavor/color component also does not include additional additives such as flavorants or aromas.

Although the flavor/color component is preferably in powder form, it may also be in solid or tablet form. In the latter cases, the sweetener and flavor/color components are typically combined first and then formed into one or more tablets or another solid form. If the flavor/color and sweetener components are in powder form, they are preferably dry mixed before packaging. Regardless of the form, the flavor/color component, as well as the sweetener component, should be quick dissolving or dispersing, i.e., sufficient dissolution or dispersion in a hot liquid should occur in about 2–3 seconds with stirring.

Any conventional method may be utilized to prepare the flavor/color component. One method of improving dissolution or dispersion of the flavor/color component when it is prepared in a powder form is to use an agglomeration process. Typically, an agglomerating fluid such as oil, liquid, water or steam is uniformly distributed throughout the spray- or freeze-dried particles of the flavor/color component causing the particles to become tacky. The particles are then agitated so that the particles contact and adhere to one another. The amount of agglomerating fluid and time of agitation are controlled to regulate the final size of the agglomerated particles. It is not necessary that the flavor/color and sweetener components be uniformly combined. For example, where a stick-pack or a pinch-pack is utilized for packaging, the flavor/color and sweetener components may be layered as described in Example 9.

In a preferred embodiment of the invention, the flavor/color component is agglomerated, instant coffee which, upon addition of the hot liquid, forms a cappuccino type beverage. Instant coffee is conventionally prepared by roasting and grinding coffee beans, extracting the roast and ground coffee with water to form an aqueous coffee extract, and then drying the extract, typically by spray- or freeze-drying. The coffee may be a single variety of coffee beans or a blend of several varieties. The coffee may further be decaffeinated. Any conventional method may also be utilized to agglomerate the coffee as described above.

In the preferred embodiment wherein the flavor/color component is instant coffee, the sweetener component is fine granulated sugar. The density of the coffee is preferably between 15–40 g/100 ml, more preferably 20–28 g/100 ml and the density of the sugar is preferably between 60–90 g/100 ml, more preferably 70–90 g/100 ml. In this embodiment, the composition includes 30–80%, and preferably 40–75% by weight of the foaming creamer, and 20–75%, preferably 25–60% by weight, of the mixture of sugar and coffee. The sugar component makes up about 15–50%, preferably 25–35% by weight of the total composition and the coffee is present in the amount of 5–30%, preferably 15–20% by weight of the total composition.

When it is desired to reduce or eliminate the sugar content of the formulation and incorporate one or more artificial sweeteners, a bulking agent such as maltodextrin, polydextrine, lactose, and the like may be substituted for substantially the same amount of sugar. Moreover, the present invention also contemplates use of a component such as aspartame, cyclamate, acesulfam-K, or saccharin as the sweetener component.

The flavor/color component naturally has color which may be brown, green, yellow or another color depending on the beverage. However, if desired, additional coloring components may be added, typically to the mixture of flavor/color and sweetener components, such that the beverage, including the foam layer produced upon reconstitution in a hot liquid, has the desired color. Any conventional coloring components, such as caramel, may be utilized.

The mixture of the invention may further include flavorants and aromas. The term flavorants as used herein refers to flavorings such as fruit, nut, chocolate, herb, etc. These flavorants are typically obtained from encapsulated or liquid flavors which may be natural or artificial. The aromas may be natural or synthetic. Natural aromas are typically collected during the preparation of the instant flavor/color component. In the case of instant coffee, for example, the volatile aromas are flushed from the coffee during processing using an inert carrier gas such as nitrogen. The carrier gas is then chilled to cause the aromas to condense. The aromas are collected and then absorbed into a suitable carrier such as coffee oil or, alternatively, absorbed into the carrier during condensation. The flavorants and aromas may be added to either the mixture of flavor/color and sweetener components, to the creamer or to both. However any additional additives should be added in such quantities that the density of the mixture of flavor/color and sweetener components is at least 1.9 preferably at least 2.3 times higher than the density of the foam layer.

Thickening agents, such as food grade gums, may also be employed to enhance mouthfeel of the composition when reconstituted in a hot liquid. The composition may further include thickening agents such as natural and synthetic gums and natural and chemically modified starches.

The invention is further illustrated in the examples which follow.

EXAMPLE 1

The following experiments were conducted to determine the densities of foam layers produced by gasified foaming creamers having different densities. The creamers used were the standard gasified foaming creamers having a composition of 53.0% Skimmed Milk Solids in the dry state, 4.0% Lactose Monohydrate and 29.5% fat. Each of the creamers was dissolved in water, the resulting foam layer scooped off the surface and the density of the foam was measured.

The densities of the creamers were as follows:

|    | Density of Creamer | Density of Foam Layer |
|----|--------------------|------------------------|
| C1 | 12.45 g/100 ml     | 19.5 g/100 ml          |
| C2 | 15.19 g/100 ml     | 19.5 g/100 ml          |
| C3 | 19.25 g/100 ml     | 19.9 g/100 ml          |

The conclusion from this set of experiments is that foam density is fairly consistent and unrelated to creamer density.

EXAMPLE 2

Tests were conducted using three variables or factors: different density coffees, different density creamers and different density sugars. These tests followed a factorial design, where factors were ranged at 3 levels (3×3), representing a typical product range.

The coffees used were standard instant, agglomerated coffees as purchased from the supermarket. The coffees were differentiated by densities and the three examples chosen were of a low, medium and high density, where:

Low=22.4 g/100 ml

Medium=25.3 g/100 ml

High=28.1 g/100 ml

The sugars used were standard fine granulated sugars as purchased from the supermarket. The sugars were differentiated by densities and the three examples chosen were of a low, medium and high density, where:

Low=79.9 g/100 ml

Medium=83.2 g/100 ml

High=87.9 g/100 ml

The creamers C1–C3 described in Example 1 were utilized.

Beverages were prepared by adding 6 g of the foaming creamer to a cup, pouring 130 ml hot water into the cup and stirring until the creamer dissolved. A mixture of 2 g of a quick dissolving agglomerated coffee and 4 g of fine granulated sugar was then added. The mixture was stirred 3–5 times to dissolve the coffee. The experimental results are shown below:

| | Coffee + Sugar Mix | | | | |
|---|---|---|---|---|---|
| Sugar Density | Coffee Density | Aggregate Coffee/Sugar Density | Creamer Type | | |
| | | | C1 | C2 | C3 |
| 79.9 g/100 ml | 22.4 g/100 ml | 49.2 g/100 ml | Good two tone foam | Good two tone foam | Good two tone foam |
| | 25.3 g/100 ml | 53.4 g/100 ml | Good two tone foam | Good two tone foam | Good two tone foam |
| | 28.1 g/100 ml | 57.7 g/100 ml | Good two tone foam | Good two tone foam | Good two tone foam |
| 83.2 | 22.4 | 53.30 g/100 ml | Good two tone foam | Good two tone foam | Good two tone foam |
| | 25.3 | 55.6 g/100 ml | Good two tone foam | Good two tone foam | Good two tone foam |
| | 28.1 | 58.2 g/100 ml | Good two tone foam | Good two tone foam | Good two tone foam |

-continued

| Coffee + Sugar Mix | | | | | |
|---|---|---|---|---|---|
| Sugar Density | Coffee Density | Aggregate Coffee/Sugar Density | Creamer Type | | |
| | | | C1 | C2 | C3 |
| 87.9 | 22.4 | 59.2 g/100 ml | Good two tone foam | Good two tone foam | Good two tone foam |
| | 25.3 | 62.3 g/100 ml | Good two tone foam | Good two tone foam | Good two tone foam |
| | 28.1 | 65.6 g/100 ml | Good two tone foam | Good two tone foam | Good two tone foam |

EXAMPLE 3

Tests were conducted to evaluate the effect that different types of cups/mugs have on reconstitution of the composition and the consequent swirling effect of the foam. Four types of cups/mugs were used to demonstrate this effect. The same instant dry mix composition containing an instant coffee was utilized for each of the experiments. In all experiments, creamer was added to a cup. Hot water was poured in and the product was stirred until dissolved. The quick dissolving coffee-sugar mix (1:2 ratio) was poured in next. The ratio of the creamer to the coffee/sugar mix was 1:1. The water to product ratio was 11:1. The differences in the density between the coffee/sugar mix and the foam enabled the coffee to be propelled through the foam layer such that only a small amount of coffee was retained in the foam layer. The product in each experiment was stirred 3–5 times or 2–3 seconds.

| Cup type and diameter | 250 ml volume | 130 ml volume |
|---|---|---|
| Large mug with top diameter of 8.1 cm and bottom diameter of 4.5 cm | Good two tone foam | Good two tone foam |
| Beaker with top diameter of 7.0 cm and bottom diameter of 7.0 cm | Good two tone foam | Good two tone foam |
| Large cup, top diameter of 9.5 cm and bottom diameter of 4.5 cm | Good two tone foam | Good two tone foam |
| Standard cup with top diameter of 7.6 cm and bottom diameter of 4.0 cm | Good two tone foam | Good two tone foam |

The conclusion from this set of experiments was that the size of the mug/cup did not influence whether or not the two-tone effect could be achieved with 3–5 quick stirs.

EXAMPLE 4

The following experiments were conducted to evaluate the instant particulate dry mix composition of the invention when instant tea or hot chocolate were utilized as the flavor/color component:

Drinking Chocolate—Creamer was added to a cup and hot water was poured in and stirred until the creamer dissolved. The density of the foam layer was measured as 20 g/100 ml. A particulate hot chocolate+sugar mix having a density of 78.1 g/100 ml was poured in next. It was observed that the differences in the density between the drinking chocolate/sugar mixture and foam layer enabled the drinking chocolate/sugar mixture to be propelled through the foam layer such that only a small amount of drinking chocolate was retained in the foam layer. With quick stirring, i.e., 3–5 stirs, a two-toned foam effect was achieved from the residual chocolate in the foam layer, while the bulk of the drinking chocolate/sugar mixture dissolved/dispersed below the foam layer.

Instant tea—Creamer was added to a cup and hot water was poured in and stirred until the creamer dissolved. The density of the foam layer was measured as 20 g/100 ml. The instant particulate tea+sugar mix having a density of 46.6 g/100 ml was poured in next. The differences in the density between the instant tea/sugar mixture and foam layer enabled the instant tea/sugar mixture to be propelled through the foam layer leaving only a small amount of tea in the foam layer. With quick stirring, i.e., 3–5 stirs, a two-toned foam effect was achieved from the residual tea in the foam layer while the bulk of the tea/sugar mixture dissolved below the foam layer.

The conclusion from this set of experiments was that a two-toned foam effect can be achieved with various recipes, as long as the density differential between the flavor/color component and the foam layer is maintained.

EXAMPLE 5

Tests were conducted using different ratio's of coffee+sugar density to foam density. The results are tabulated below.

| Coffee + Sugar Density | Foam Density | Density Ratio Coffee + Sugar to Foam | Weight Ratio Coffee + Sugar Mixture/Creamer | Final Product Appearance |
|---|---|---|---|---|
| 34.6 | 20 | 1.70 | 2.00 | Brown |
| 34.6 | 20 | 1.70 | 1.33 | Brown |
| 34.6 | 20 | 1.70 | 1.00 | Brown |
| 34.6 | 20 | 1.70 | 2.50 | Brown |
| 34.6 | 20 | 1.70 | 1.67 | Brown |
| 34.6 | 20 | 1.70 | 1.25 | Brown |
| 38.4 | 20 | 1.92 | 1.00 | Brown |
| 38.4 | 20 | 1.92 | 1.50 | Brown |
| 38.4 | 20 | 1.92 | 2.00 | Sometimes |
| 38.4 | 20 | 1.92 | 0.67 | Brown |
| 38.4 | 20 | 1.92 | 1.00 | Brown |
| 38.4 | 20 | 1.92 | 1.33 | Sometimes |
| 38.4 | 20 | 1.92 | 0.50 | Brown |
| 38.4 | 20 | 1.92 | 0.75 | Brown |
| 38.4 | 20 | 1.92 | 1.00 | Sometimes |
| 42.8 | 20 | 2.14 | 1.00 | Brown |
| 42.8 | 20 | 2.14 | 1.50 | Sometimes |
| 42.8 | 20 | 2.14 | 2.00 | Good |
| 42.8 | 20 | 2.14 | 0.67 | Brown |
| 42.8 | 20 | 2.14 | 1.00 | Sometimes |
| 42.8 | 20 | 2.14 | 1.33 | Good |
| 42.8 | 20 | 2.14 | 0.50 | Brown |
| 42.8 | 20 | 2.14 | 0.75 | Sometimes |
| 42.8 | 20 | 2.14 | 1.00 | Good |
| 48.0 | 20 | 2.40 | 1.00 | Good |
| 48.0 | 20 | 2.40 | 1.50 | Good |
| 48.0 | 20 | 2.40 | 2.00 | Good |
| 48.0 | 20 | 2.40 | 0.67 | Good |

-continued

| Coffee + Sugar Density | Foam Density | Density Ratio Coffee + Sugar to Foam | Weight Ratio Coffee + Sugar Mixture/Creamer | Final Product Appearance |
|---|---|---|---|---|
| 48.0 | 20 | 2.40 | 1.00 | Good |
| 48.0 | 20 | 2.40 | 1.33 | Good |
| 48.0 | 20 | 2.40 | 0.50 | Good |
| 48.0 | 20 | 2.40 | 0.75 | Good |
| 48.0 | 20 | 2.40 | 1.00 | Good |

Final Product Appearance Definitions:

Brown—A uniform brown color appears on the surface of the cappuccino.

Good—A two-tone foam where a brown swirl appears on a white background.

Sometimes—In a series of preparations, some outcomes were classified as "good two-tone foam" and some were classified as "uniform brown foam".

The conclusion from this set of experiments was that:

(1) If the density ratio of coffee+sugar to foam is >2.3, then a two-toned foam is always achieved.

(2) If the density ratio of coffee+sugar foam is between 1.9–2.29, then two-toned foam is best achieved when the weight ratio of coffee+sugar mixture/creamer is >1.

(3) If the density ratio of coffee+sugar to foam is below 1.9, a two-toned effect is not achieved.

EXAMPLE 6

Tests were performed using a higher density flavor/color component, typically chocolate with a density of 67.0 g/100 ml.

The foam density of the creamer was typically 20.0 g/100 ml. 2.0 g of a 67.0 g/100 ml density coloring agent (Cadbury brand chocolate), i.e., the flavor/color component, was poured onto the foam. The difference in the density between the coloring agent and the foam propelled the coloring agent through the foam layer. The mixture was stirred 3–5 times or 2–3 seconds.

The conclusion from this set of experiments is that a two-toned foam effect is achieved with 3–5 stirs or within 2–3 seconds when the foam density is 20.0 g/100 ml and the flavor/color component density is 67.0 g/100 ml.

EXAMPLE 7

Experiments were conducted to determine the effect of adding the sweetener component in a separate action after addition of the flavor/color component. 6 g of a standard foaming creamer was added to a standard cappuccino cup and 130 ml of hot water was poured in and stirred until the creamer had dissolved. The foam density of this creamer was typically 20.0 g/100 ml. 2.0 g of a typically 25.3 g/100 ml density coffee was spooned onto the creamer foam and 4.0 g of an 83.2 g/100 ml density sugar was spooned immediately over the coffee. The beverage was stirred 3–5 times, i.e., 2–3 seconds. A uniform brown foam resulted. The conclusion from this set of experiments was that the two-toned foam effect was not achieved with a three step execution as summarized above. The coffee sat on top of the foam and began to disperse into the foam. By the time the sugar could be added sequentially, so much of the foam was colored that a uniform brown foam resulted on stirring.

EXAMPLE 8

Experiments were conducted to determine the effect of adding the flavor/color component in a separate action after addition of the sweetener component. 6 g of a standard foaming creamer was added to a standard cappuccino cup and 130 ml of hot water was poured in and stirred until the creamer had dissolved. The foam density of the creamer was typically 20.0 g/100 ml. 4.0 g of a 83.2 g/100 ml density sugar was spooned onto the creamer and 2.0 g of a 25.3 g/100 ml coffee was spooned immediately over the sugar. The beverage was quickly stirred 3–5 times. A uniform brown foam resulted. The conclusion from this set of experiments was that the two-tone foam effect was not achieved with a three step execution as summarized above. The sugar sank immediately through the foam layer and the coffee sat on top of the foam and began to disperse into the foam. A uniform brown foam resulted on stirring.

EXAMPLE 9

A set of experiments was conducted to determine the effect of layering the flavor/color and sweetener components in a single serve sachet. 6 g of a standard creamer (foam density of 20.0 g/100 ml) was added to a cup and 130 ml of hot water was poured in and stirred until the creamer had dissolved. 4.0 g of sugar (density 83.2 g/100 ml) was poured into a packaging system that created a funnel effect on delivery, typically a stick-pack. 2.0 g of coffee (density 25.3 g/100 ml) was added into the stick-pack forming a layer over the sugar. The stick-pack was opened at the coffee end and then tipped over such that the coffee and sugar layers (with an aggregate density of about 56 g/100 ml) were poured into the creamer mix and quickly stirred 3–5 times in one action. In this arrangement the sugar followed the coffee immediately so that their aggregate density caused them to sink before the coffee had time to disperse into the foam layer.

A two-tone foam effect was achieved.

The conclusion from this experiment was that the two-tone foam effect can be achieved with layering of the component as long as the sweetener component follows flavor/color component immediately in a single action.

EXAMPLE 10

Tests were conducted using a creamer of a lower density foam. Typically 6 g of a foaming creamer was added to a standard cappuccino cup. 130 ml of hot water was poured in and stirred until the creamer had dissolved. The foam density of the creamer was typically 16 g/100 ml. A 2 g coffee+4 g sugar mixture having an aggregate density of 56 g/100 ml was poured into the creamer mix and quickly stirred 3–5 times in one action. A two toned effect was achieved.

The conclusion from this set of experiments was that a two-toned foam can be achieved when the foam density is as low as 16 g/100 ml.

Although the invention has been described in considerable detail with respect to preferred embodiments thereof, variations and modifications will be apparent to those skilled in the art without departing from the spirit and scope of the invention as set forth in the claims.

What is claimed is:

1. A packaged instant dry mix beverage composition for producing a beverage having a two-toned foam on its surface comprising:
   a first component comprising a foaming creamer for producing a foam layer upon reconstitution in a hot liquid; and
   a second component comprising a fast dissolving or dispersing flavor/color component, said second component being separated from said creamer, wherein the density of the flavor/color component is at least 1.9 times greater than density of the foam layer, and whereby a two-toned effect is created in said foam layer upon addition of said second component followed by stirring, with the proviso that when the density of the second component is between 1.9 to 2.29 times greater than the density of the foam layer, the weight ratio of the second component/first component must be greater than 1.

2. The composition according to claim 1 wherein the density of the second component is at least 2.3 times greater than the density of the foam layer.

3. The composition according to claim 1 wherein the flavor/color component is selected from the group consisting of instant coffee, tea and drinking chocolate.

4. The composition according to claim 3 wherein the flavor component comprises coffee.

5. The composition according to claim 1 wherein the second component further comprises a sweetener component.

6. The composition according to claim 5 wherein the sweetener component comprises sugar.

7. The composition according to claim 1 wherein the second component is in a solid, powder, or a tablet form.

8. The composition according to claim 1 wherein the weight of the second component exceeds the weight of the creamer.

9. A packaged instant dry mix beverage composition for producing a coffee beverage having a two-toned foam on its surface comprising:
   a foaming creamer for producing a foam layer upon reconstitution in a hot liquid; and
   a mixture of a sweetener component and coffee, said mixture being separated from said creamer, density of the mixture being at least 1.9 times higher than the density of the foam layer, whereby a two-toned effect is created in said foam layer upon addition of said mixture followed by stirring, with the proviso that when the density of the second component is between 1.9 to 2.29 times greater than the density of the foam layer, the weight ratio of the second component/first component must be greater than 1.

10. The composition according to claim 9 wherein the sweetener component comprises sugar.

11. The composition according to claim 10 wherein density of the coffee is between 15–40 g/100 ml, density of the sugar is between 60–90 g/100 ml and density of the foam layer produced upon reconstitution of the foaming creamer is 16–25 g/100 ml.

12. The composition according to claim 11 wherein density of the coffee is between 20–28 g/100 ml, density of the sugar is between 70–90 g/100 ml and density of the foam layer produced upon reconstitution of the foaming creamer is 19–21 g/100 ml.

13. The composition according to claim 10 wherein the composition comprises 40–75% by weight of the foaming creamer and 25–60% by weight of the second component.

14. The composition according to claim 13 wherein the composition comprises 30–80% by weight of the foaming creamer, 15–50% by weight of the sugar and 5–30% by weight of the coffee.

15. The composition according to claim 14 wherein the composition comprises 30–60% by weight of the foaming creamer, 25–35% by weight of the sugar and 15–20% by weight of the coffee.

16. The composition according to claim 9 wherein the weight of the second component exceeds the weight of the creamer.

17. A method of preparing an instant beverage composition having a two-toned foam surface comprising:
   dissolving a foaming creamer in a hot liquid to create a foam layer on a surface of the liquid;
   adding to said dissolved creamer and hot liquid a second component comprising a fast dissolving or dispersing flavor/color component, density of the second component being at least 1.9 times higher than density of the foam layer, with the proviso that when the density of the second component is between 1.9 to 2.29 times greater than the density of the foam layer, the weight ratio of the second component/first component must be greater than 1; and
   stirring the resultant mixture to create a two-toned effect in the foamed surface.

18. The composition according to claim 17 wherein the density of the second component is at least 2.3 times greater than the density of the foam layer.

19. The composition according to claim 17 wherein the flavor/color component is selected from the group consisting of instant coffee, tea and drinking chocolate.

20. The composition according to claim 17 wherein the second component further comprises a sweetener component.

21. The composition according to claim 20 wherein the sweetener component comprises sugar.

22. The composition according to claim 21 wherein the flavor/color component comprises coffee.

23. The composition according to claim 22 wherein density of the coffee is between 15–40 g/100 ml, density of the sugar is between 60–90 g/100 ml and density of the foam layer produced upon reconstitution of the foaming creamer is 17–25 g/100 ml.

24. The composition according to claim 23 wherein density of the coffee is between 20–28 g/100 ml, density of the sugar is between 70–90 g/100 ml and density of the foam layer produced upon reconstitution of the foaming creamer is 19–21 g/100 ml.

25. The composition according to claim 24 wherein the composition comprises 40–75% by weight of the foaming creamer and 25–60% by weight of the second component.

26. The composition according to claim 25 wherein the composition comprises 30–80% by weight of the foaming creamer, 15–50% by weight of the sugar and 5–30% by weight of the coffee.

27. The composition according to claim 26 wherein the composition comprises 30–60% by weight of the foaming creamer, 25–35% by weight of the sugar and 15–20% by weight of the coffee.

28. The composition according to claim 17 wherein the weight of the second component exceeds the weight of the creamer.

29. The composition according to claim 17 wherein the second component is in a solid, powder, or a tablet form.

* * * * *